United States Patent
Fields et al.

(10) Patent No.: US 7,381,045 B2
(45) Date of Patent: Jun. 3, 2008

(54) QUICK CHANGE BLOW MOLD TOOLING

(75) Inventors: Randal L. Fields, Greenwood, MO (US); Michael D. Whitney, Overland Park, KS (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 339 days.

(21) Appl. No.: 11/215,600

(22) Filed: Aug. 30, 2005

(65) Prior Publication Data

US 2007/0048399 A1    Mar. 1, 2007

(51) Int. Cl.
*B29C 49/48* (2006.01)
*B29C 49/56* (2006.01)

(52) U.S. Cl. .............. 425/182; 425/195; 425/522; 425/525; 425/538; 425/541

(58) Field of Classification Search .......... 425/182, 425/195, 522, 525, 538, 541
See application file for complete search history.

(56) References Cited

U.S. PATENT DOCUMENTS

| | | | | |
|---|---|---|---|---|
| 2,331,688 A * | 10/1943 | Hobson | ............... | 264/536 |
| 4,457,688 A * | 7/1984 | Calvert et al. | ............... | 425/525 |
| 4,484,880 A * | 11/1984 | Schwarz | ............... | 425/192 R |
| 4,544,340 A * | 10/1985 | Hehl | ............... | 425/183 |
| 4,655,275 A * | 4/1987 | Worner | ............... | 425/195 |
| 5,078,586 A * | 1/1992 | Holzschuh | ............... | 425/192 R |
| 5,486,101 A * | 1/1996 | Guyon | ............... | 425/192 R |
| 5,496,166 A | 3/1996 | Vogel et al. | | |
| 6,036,469 A * | 3/2000 | Allen et al. | ............... | 425/192 R |
| 6,450,795 B1 | 9/2002 | Fields et al. | | |
| 6,615,472 B2 * | 9/2003 | Petre | ............... | 29/426.1 |
| 6,824,377 B2 * | 11/2004 | Lefebure | ............... | 425/541 |

* cited by examiner

*Primary Examiner*—Robert B Davis
(74) *Attorney, Agent, or Firm*—Hovey Williams LLP

(57) ABSTRACT

Quick change blow mold tooling includes a pair of mold cavity blocks that cooperate to define a series of blow cavities. The tooling further includes a pushup plate having a series of bottom contours that plug the otherwise open bottoms of the cavities when the pushup plate is against the bottom of the mold blocks. Each mold block is quickly attached to and detached from its supporting back plate using studs that fit into receiving holes on the back plate and cam locking shafts that are accessible from opposite side edges of the back plates. The back plates thus remain secured to platens of the bottle forming machine during change out of the tooling. Similarly, the push up plate has a pair of locking studs projecting from the underside thereof that are received within socket members attached to the machine. The socket members are provided with quick release threaded couplers that can be locked and unlocked by hand.

25 Claims, 10 Drawing Sheets

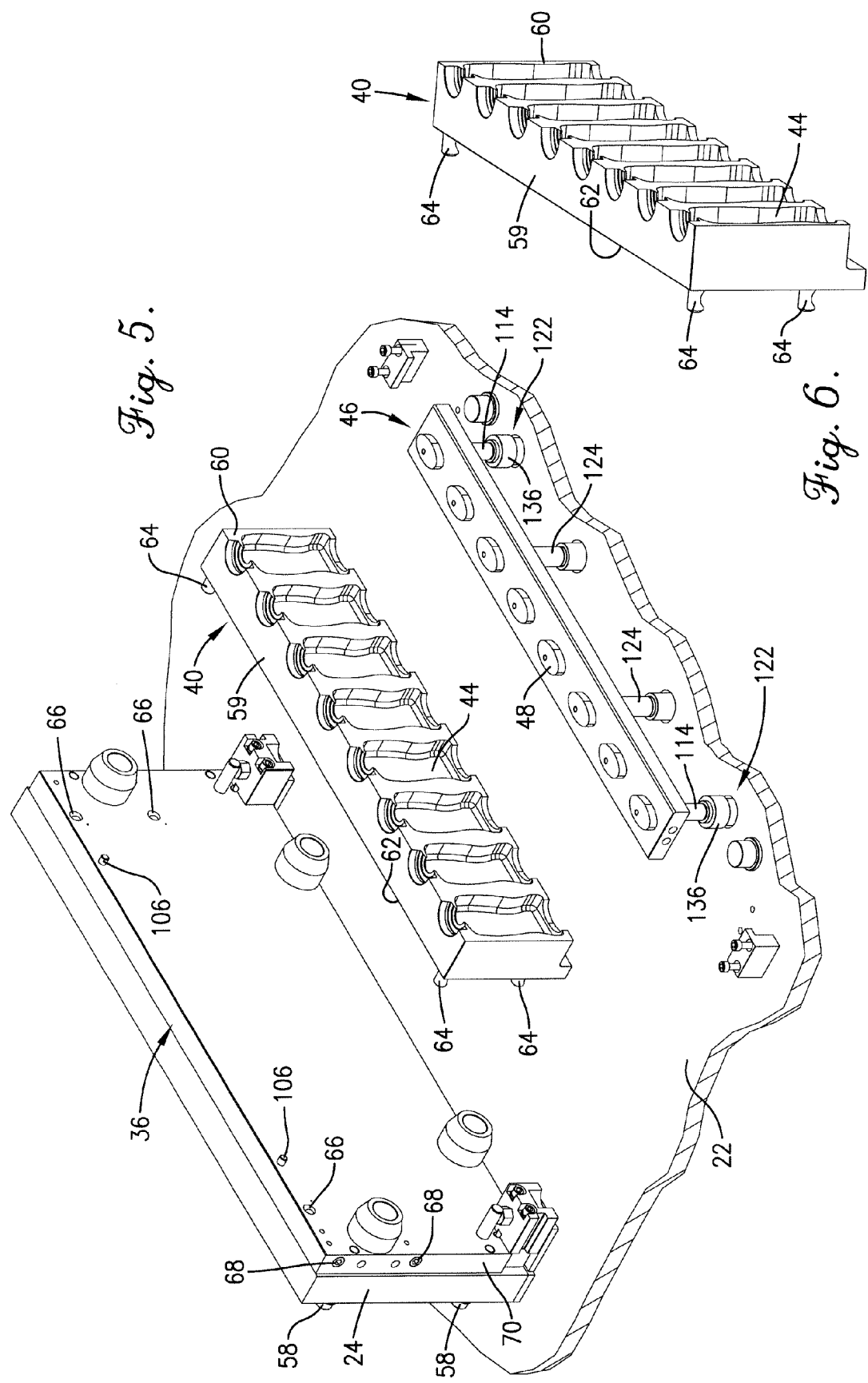

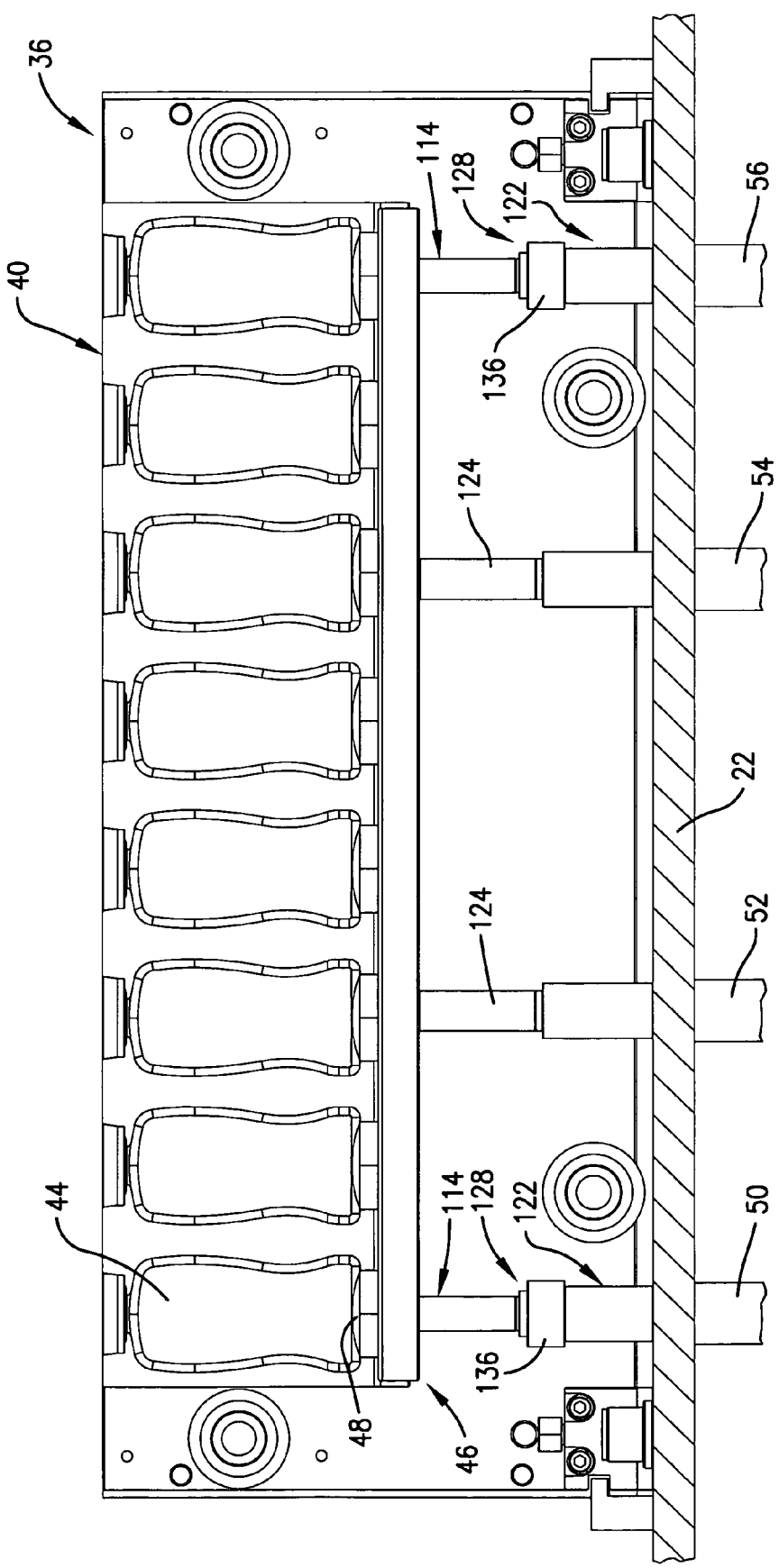

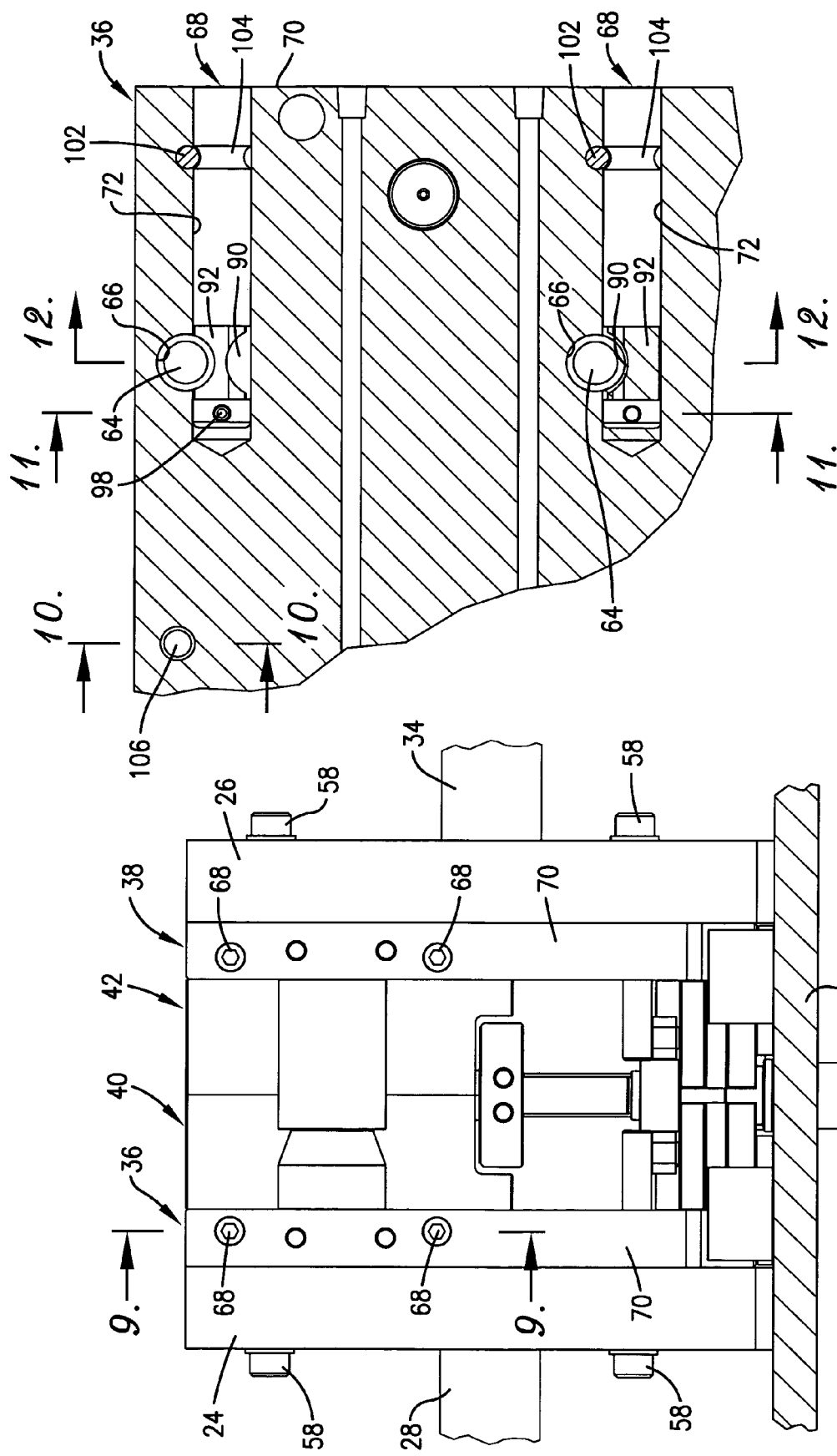

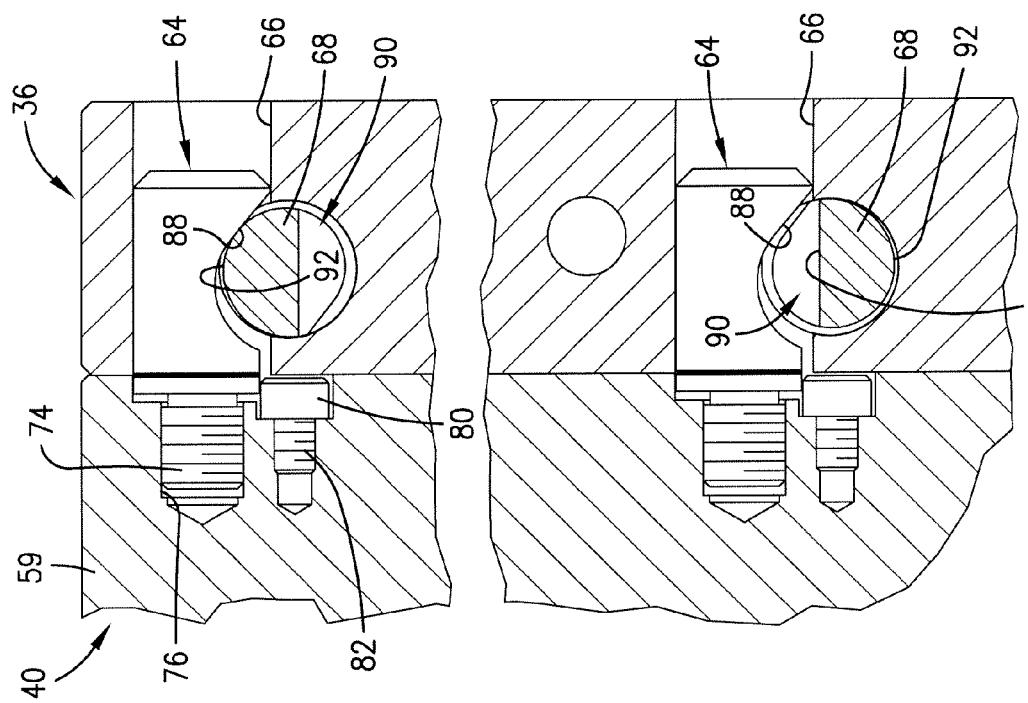
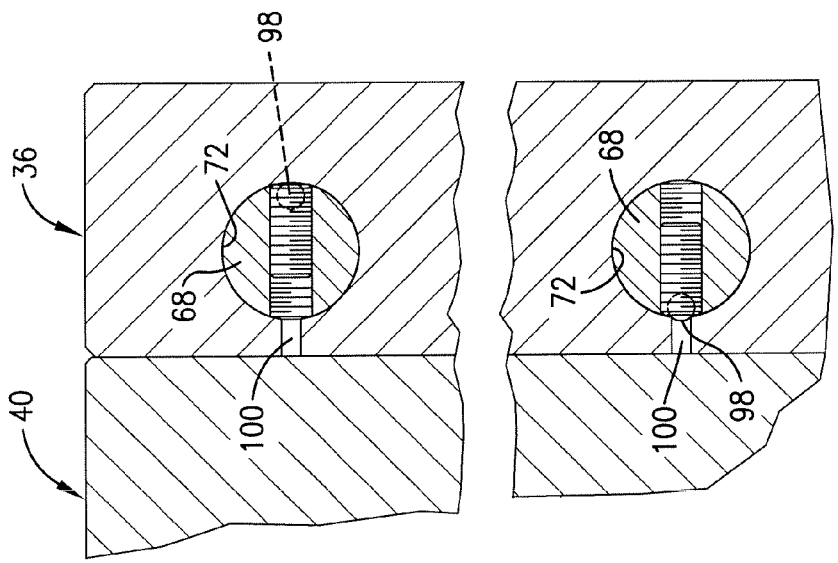
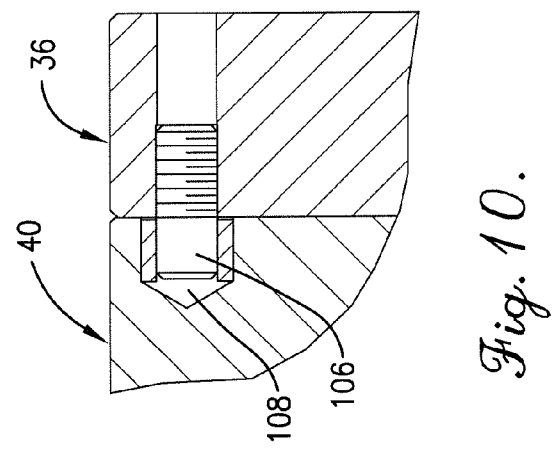

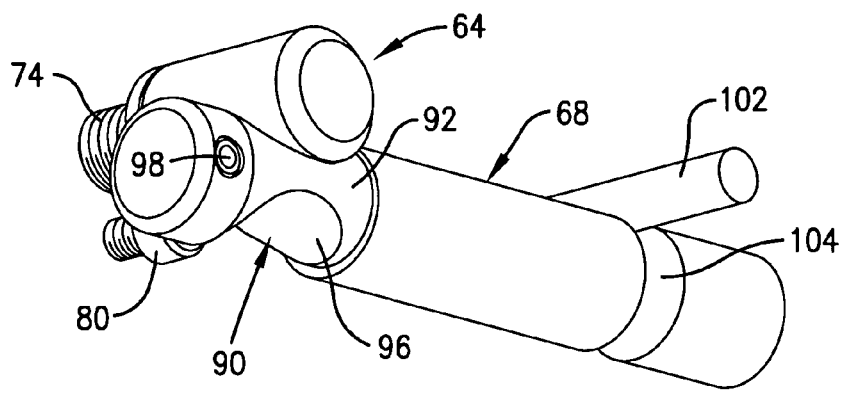
Fig. 13.
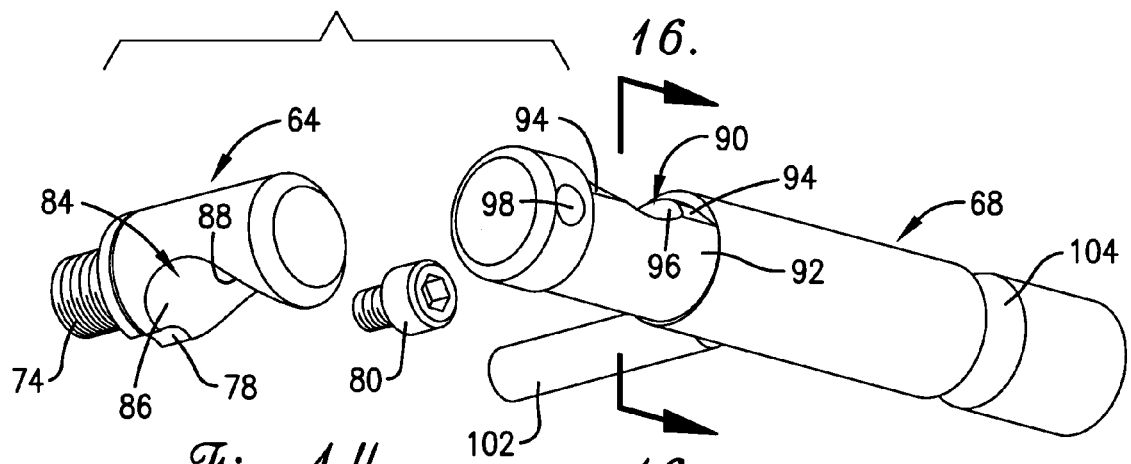
Fig. 14.
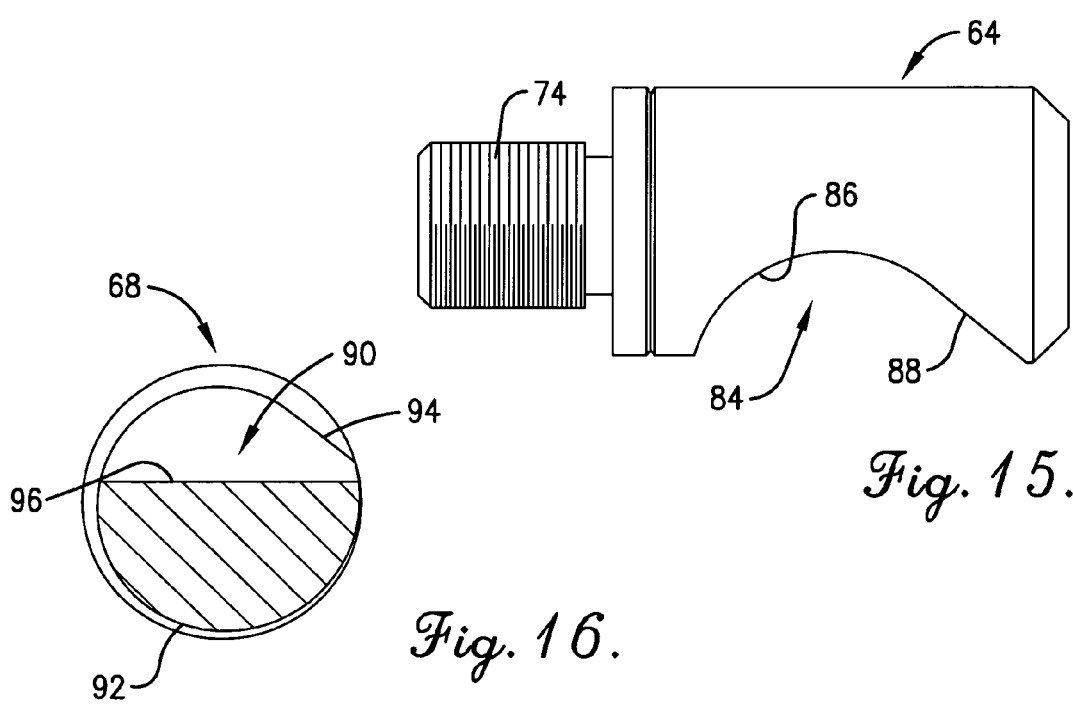
Fig. 15.
Fig. 16.

QUICK CHANGE BLOW MOLD TOOLING

TECHNICAL FIELD

This invention relates to blow mold tooling for use in the making of plastic bottles and the like.

BACKGROUND AND SUMMARY

Machines for blow molding plastic bottles have a blow station at which soft, warm preforms having the general appearance of test tubes become received within larger blow cavities having the shape of the finished bottle. Pressurized air, with or without a stretch rod, is injected into the soft preforms, causing them to stretch and expand out to the limits and configuration of the blow cavities. Typically, such blow cavities are formed by opposing mold halves that are opened and closed at the beginning and end of the blow cycle, and by bottom mold surfaces on a pushup plate that closes the bottom of the cavities when the mold halves are closed. When the mold halves are opened and the pushup plate is retracted (or the blown bottles are lifted from the pushup plate in some machines), the blown bottles can be moved out of the blow station to an eject station or the like.

In a typical bottle blowing machine, the mold cavity halves are bolted to back plates that are in turn releasably secured to opposing platens of the machine that reciprocate toward and away from another at the beginning and end of the blow cycle. In order to repair one of the cavity halves, or to change out tooling for a new bottle, the heavy, unwieldy back plates with the cavity halves attached, must be unbolted from the platens and carefully extracted from the machine using overhead cranes or other assisting apparatus. Similarly, to repair or replace a pushup plate, the pushup plate must be unbolted from the actuating mechanism that extends and retracts the plate between its various positions. Depending upon the construction of the plate, certain individual mold surfaces must be unbolted from the plate before the primary mounting screws can be accessed to release and remove the pushup plate from the machine. Change out or repair of conventional tooling can thus be a very tedious, time-consuming and laborious process. It can also be costly, since no profit is generated by an idle machine.

The present invention provides quick change tooling for the blow station of a bottle making machine so as to minimize machine down time, reduce costs, and decrease delivery time for the customer who purchases new tooling. One aspect of the invention comprises having cavity halves that are quickly and easily detachable from back plates so that the back plates can remain secured to the machine platens when the cavity halves are removed during change out or repair. Preferably, instead of a series of individually bolted-on cavity halves for each back plate, a single mold block having multiple cavity halves machined therein is provided for each back plate. Each mold block has locking studs that project from the backside thereof and fit into receiving holes in the backplate. Cam locking shafts are readily accessible from the side edges of the back plates and can be quickly and easily manipulated to lock and unlock the studs of the mold block.

In another aspect of the invention, a pushup plate that forms the bottoms of the mold cavities is quickly and easily detachable from the actuating mechanism of the machine. Preferably, instead of a series of individual bottom plugs or the like bolted onto the pushup plate, the pushup plate in accordance with the present invention comprises one long plate having a multitude of plugs or other projecting mold surfaces machined thereon. The pushup plate has a pair of locking studs at opposite ends thereof that are releasably received within respective socket members affixed to the pushup mechanism of the machine and which remain with the machine when the pushup plate is changed out. Each socket member has a quick release coupling associated therewith that allows the studs of the pushup plate to be firmly and positively secured to the machine during use yet quickly and easily removed and replaced without the use of tools.

BRIEF DESCRIPTION OF THE DRAWINGS

FIG. 5 is a fragmentary isometric view of the blow station illustrating the manner in which a mold block is removable from its backplate for repair or change out;

FIG. 6 is an isometric view of a typical mold block in accordance with the principles of the present invention;

FIG. 7 is a front elevational view of the blow station taken generally along line 7-7 of FIG. 5 but illustrating the pushup plate in its extended position in which the raised mold surfaces close off the bottom of the mold cavity halves.

FIG. 8 is an end elevational view of the blow station taken substantially along line 8-8 of FIG. 3;

FIG. 9 is an enlarged, fragmentary cross sectional view taken substantially along line 9-9 of FIG. 8 and illustrating details of the quick-release cam locking mechanism for securing the mold blocks to the back plates;

FIG. 10 is an enlarged, fragmentary detail view taken substantially along line 10-10 of FIG. 9 and illustrating one of the dowel pins that help locate the mold blocks in their proper mounting positions on the black plates;

FIG. 11 is an enlarged, fragmentary cross sectional view taken substantially along line 11-11 of FIG. 9 and illustrating details of construction of the retaining detents associated with the cam locking mechanisms;

FIG. 12 is an enlarged, fragmentary cross sectional view taken substantially along line 12-12 of FIG. 9 showing details of construction of the cam locking mechanisms;

FIG. 13 is an isometric illustration of components of one of the cam locking mechanisms;

FIG. 14 is an exploded isometric view of components of the cam locking mechanism;

FIG. 15 is an enlarged elevational view of one of the locking studs associated with a cam locking mechanism;

FIG. 16 is an enlarged transverse cross sectional view of the cam locking shaft of the cam locking mechanism taken substantially along line 16-16 of FIG. 14;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
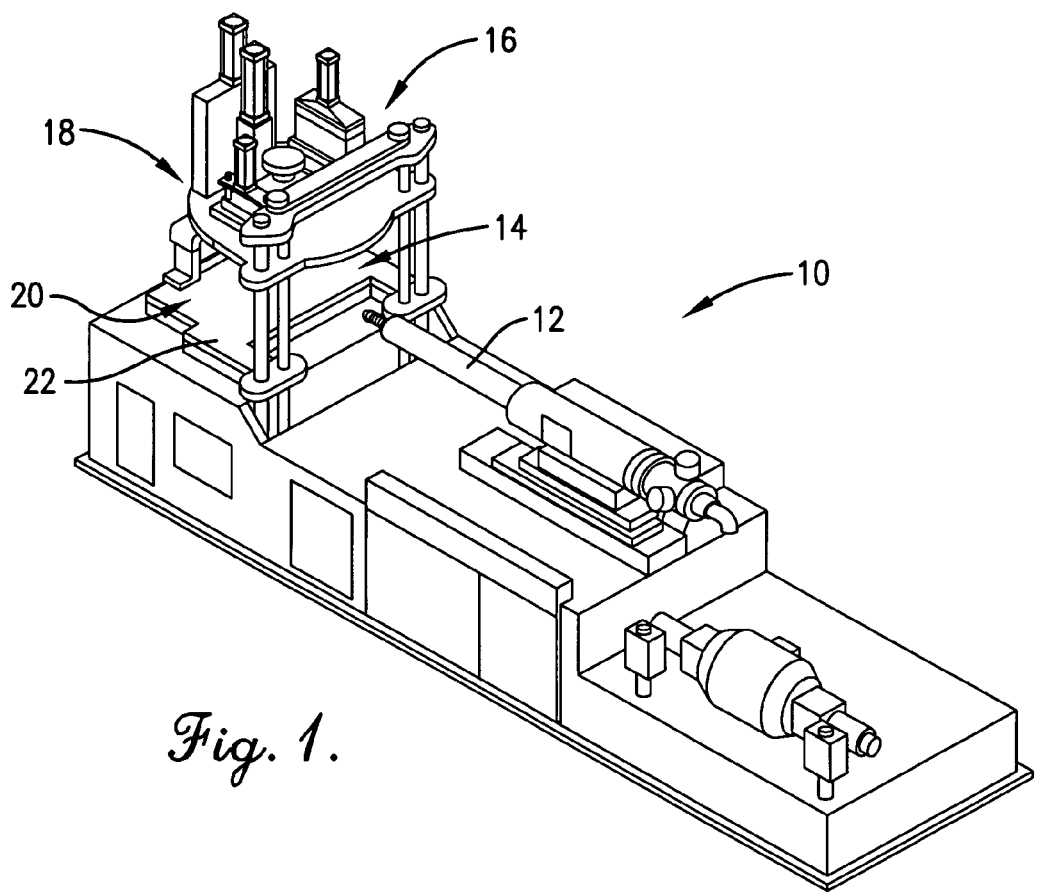
FIG. 1 is an isometric view of one exemplary form of a bottle forming machine with which the tooling of the present invention may be utilized.
Figure 2:
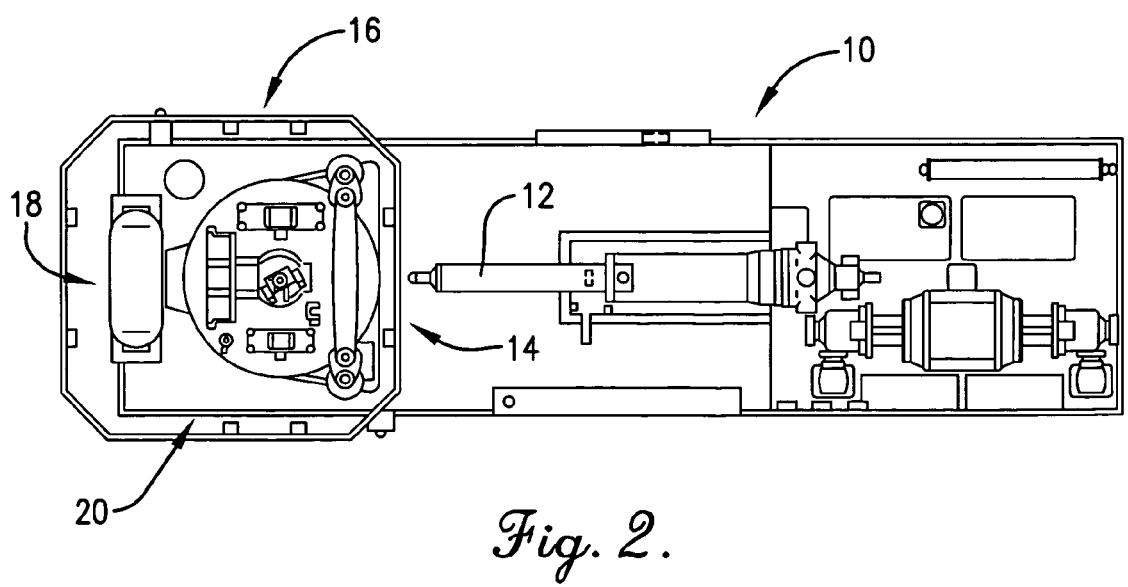
FIG. 2 is a top plan view thereof.

FIGS. 1 and 2 illustrate an injection stretch blow mold machine 10 with which the quick change tooling of the present invention has particular utility. However, it is to be appreciated that the principles of the present invention are not limited to the particular machine illustrated and described in this specification. The principles of the present invention may be beneficially applied to any bottle forming machine having a blow station utilizing tooling that must be changed out or repaired from time-to-time.

In the illustrated embodiment, machine 10 includes an injection nozzle 12 that injects molten plastic material, such as PET, into mold cavities (not shown) at an injection station 14 of the machine. Preforms that are formed at injection station 14 are then carried by a rotation plate (not shown) of the machine to a conditioning station 16, then to a blow station 18 where the preforms are expanded by pressurized air and a stretch rod into full sized bottles, and finally to an eject station 20 where the blown bottles are discharged from the machine. Machine 10 has a flat bed 22. The present invention involves the tooling utilized at blow station 18.

Figure 3:
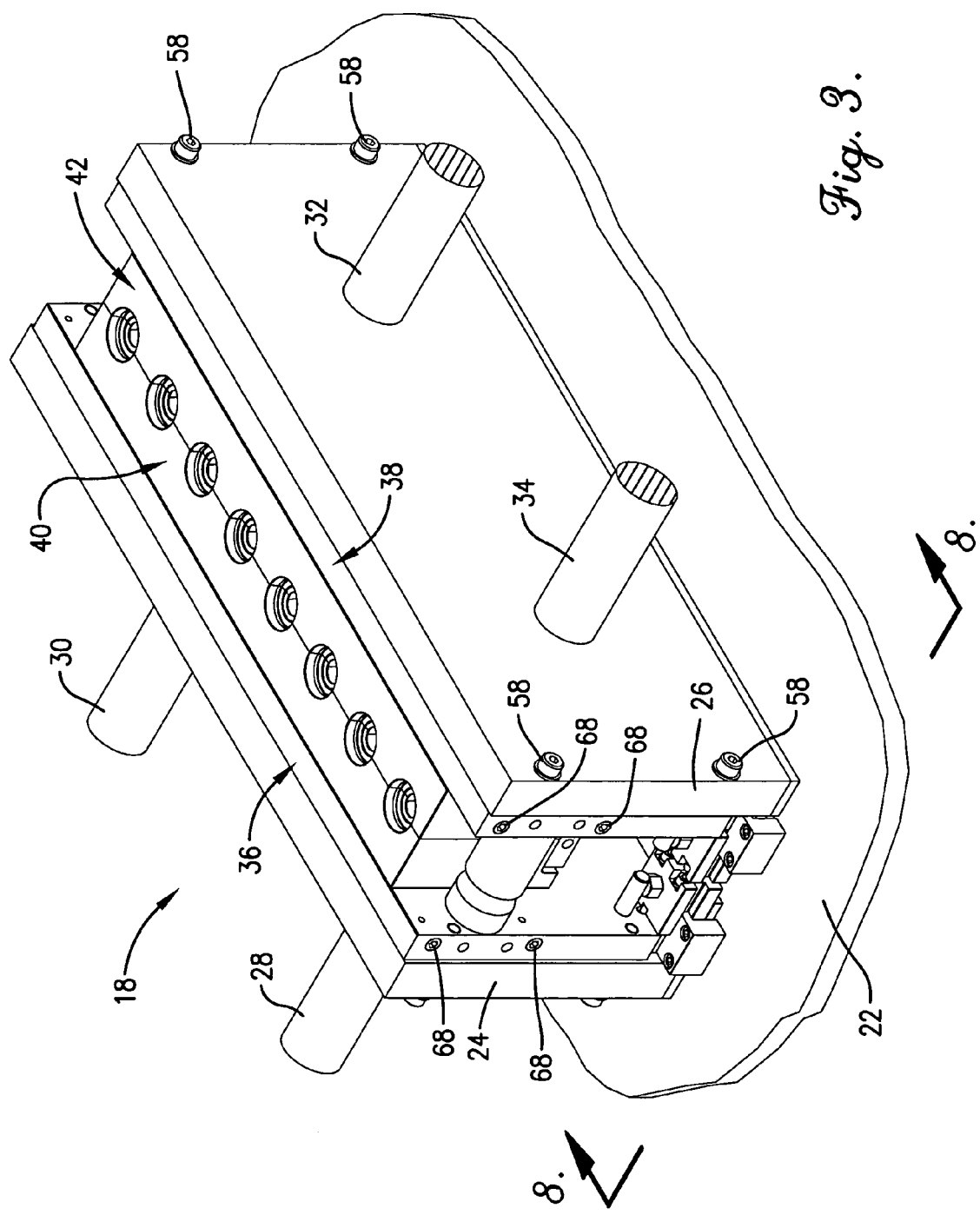
FIG. 3 is an enlarged, fragmentary isometric view of the blow station of such a machine illustrating the mold halves in a closed position.
Figure 4:
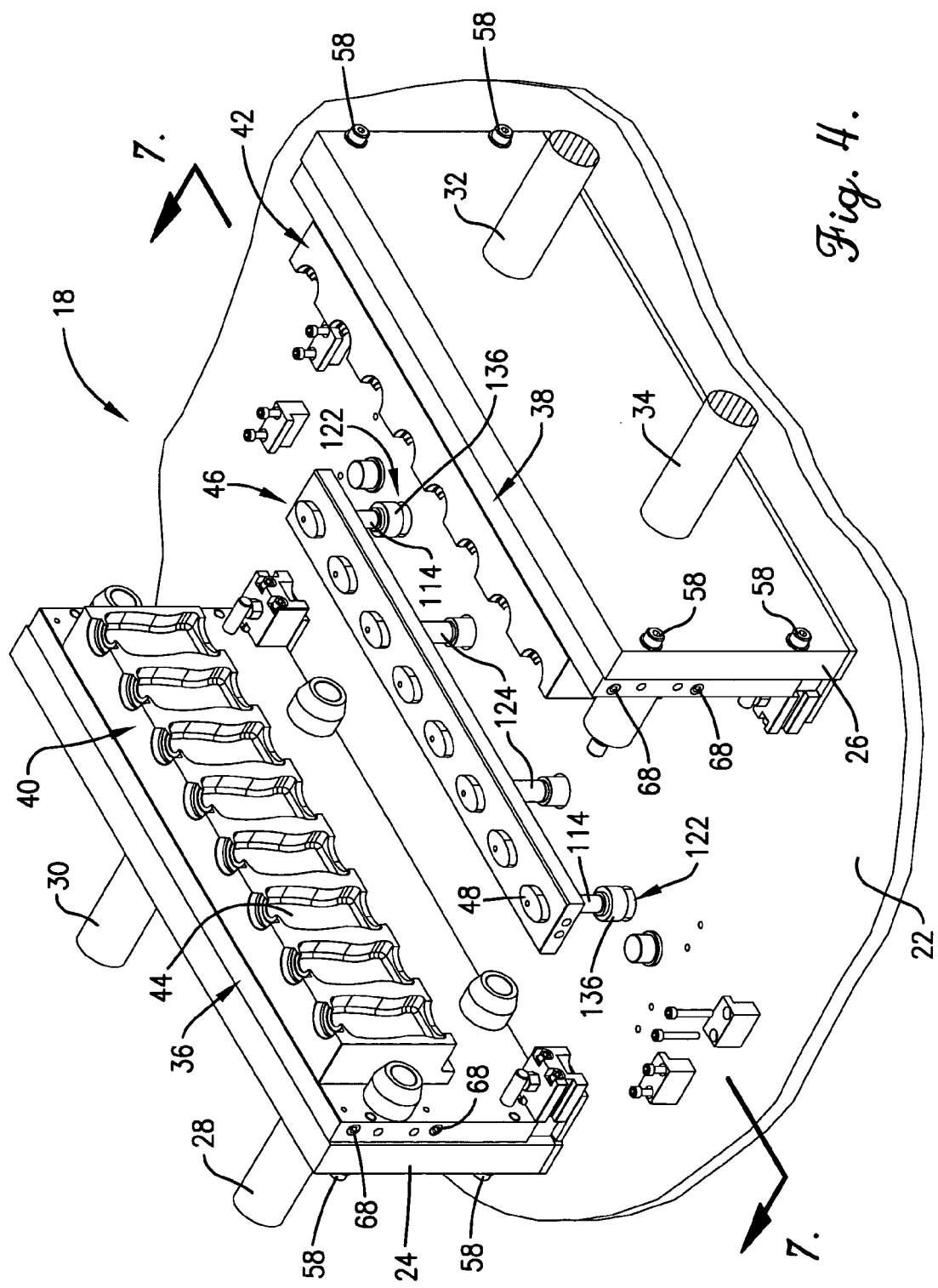
FIG. 4 is an isometric view of the blow station generally similar to FIG. 3 but showing the mold halves in their open position and with the bottom pushup plate retracted.

Referring to FIGS. 3 through 21, it will be seen that machine 10 in the illustrated embodiment has at least one pair of upright, opposed, rectangular platens 24 and 26 at blow station 18 that are reciprocated toward and away from one another on bed 22 by hydraulic mechanism including rams 28, 30, 32 and 34. Platens 24, 26 carry a pair of respective, rectangular back plates 36 and 38 that are movable with platens 24, 26 between an open position as illustrated in FIG. 4 and a closed position as illustrated in FIG. 3. Back plates 36 and 38 in turn carry opposed mold blocks 40 and 42 that each have a plurality of cavity halves 44 formed therein. When back plates 36, 38 are in their closed position, the mold blocks 40, 42 come into abutting engagement with one another in a closed position such that directly opposed cavity halves 44 cooperate to define a series of blow cavities.

Blow station 18 is also provided with a pushup plate broadly denoted by the numeral 46 and containing a series of mold surfaces 48 that cooperate with cavity halves 44 to define the closed bottom of the blow cavity when back plates 36, 38 are in their closed position. In the illustrated embodiment, pushup plate 46 is vertically reciprocable between an extended position of FIG. 7 and a retracted position of FIG. 4 by rams 50, 52, 54 and 56 (FIG. 7) associated with hydraulic pushup mechanism of machine 10. In some machines, pushup plate 46 is not shifted between extended and retracted positions. In the illustrated embodiment the bottom mold surfaces 48 associated with pushup plate 46 are raised and dome-shaped to provide a corresponding upwardly arched cavity or dome in the bottom of the bottle produced within each mold cavity, but surfaces 48 may take a variety of different shapes and contours as well understood by those skilled in the art.

In accordance with the present invention, back plates 36 and 38 are intended to remain with platens 24 and 26 during change out of the mold cavity tooling, i.e., the mold blocks 40, 42 and pushup plate 46. Thus, back plates 36 and 38 are fastened to their respective machine platens 24, 26 by suitable fasteners such as bolts 58 that are accessible from the backsides of platens 24, 26. Once back plates 36, 38 have been properly vertically adjusted relative to machine platens 24, 26, it is contemplated that bolts 58 will be tightened down and remain in such condition whenever the mold surfaces represented by mold blocks 40, 42 and pushup plate 46 are changed out.

On the other hand, mold blocks 40, 42 are designed to be quickly and easily detached from and reinstalled on their back plates 36, 38. In like manner, push up plate 46 is designed to be quickly and easily detached from the pushup rams 50, 56 and reinstalled on such rams.

Dealing first with the quick change aspects of mold blocks 40, 42, it will be seen that each mold block 40, 42 comprises a generally rectangular elongated body 59 having a front side 60 and a backside 62. The cavity halves 44 are preferably machined directly into the front side 60 of body 59, although each of the cavity halves 44 could also be machined into a separate block or plate that is in turn bolted or otherwise affixed to body 59. At least one, and preferably four, cylindrical locking studs 64 project horizontally rearwardly from backside 62 of mold block 40 at its corners and are adapted to be received within corresponding horizontally disposed holes 66 in the front face of back plate 36 or 38. Each back plate 36, 38 is, in turn, provided with a corresponding number of cam locking shafts 68 that are accessible from side edges 70 of the back plates 36, 38.

Each cam locking shaft 68 has an outer end configured to have an Allen wrench or the like applied thereto for the purpose of manipulating cam locking shaft 68 through greater than 90 but less than 270° degrees of rotation, and each cam locking shaft 68 is slightly longer than the distance between the side edge 70 and hole 66 in its corresponding back plate 36 or 38. Each cam locking shaft 68 is rotatably received within its own cylindrical bore 72 projecting inwardly from side edge 70 at a location causing the bore 72 to intersect the lower hemisphere of the corresponding hole 66. Bore 72 extends a short distance beyond the point of intersection with hole 66 as illustrated in FIG. 9.

9-16 show various details of construction of the locking studs 65 and cam locking shafts 68, as well as their interaction during locking and unlocking of the mold blocks 40, 42 from back plates 36, 38. As illustrated particularly in FIGS. 13-15, each locking stud 64 is generally cylindrical and has a reduced diameter, externally threaded shank 74 threadably received within a drilled and tapped aperture 76 (FIG. 12) in the mold block body 59. Each stud 64 has a small, axially extending indentation 78 (FIG. 14) that complementally receives the head of a retaining screw 80 when stud 64 is fully threaded into aperture 76. Retaining screw 80 is threaded into a receiving hole 82 immediately adjacent aperture 76 such that, when the head of screw 80 is received within indentation 78, screw 80 prevents stud 64 from accidentally unscrewing from mold block body 59.

Each locking stud 64 is also provided with a transverse notch 84 in its lower hemisphere that includes a longitudinally curved surface 86 and flat, inclined cam surface 88. Curved surface 86 has a radius of curvature whose center is located outwardly beyond the lower extremity of stud 64. Surface 86 extends through an arch that is greater than 90° but less than 180°. Inclined surface 88 commences at the outer end of curved surface 86 and extends as a flat surface to the outer extremity of notch 84 at an angle of approximately 40° from a longitudinal axis of the stud 64.

Each cam locking shaft 68 has its own transverse notch 90 generally adjacent the inner end of shaft 68. An external, circumferentially extending cam surface 92 on shaft 68 in the region of notch 90 leads from one end of notch 90 360° around shaft 68 at a progressively increasing radial distance from the longitudinal center axis of shaft 68. At its smallest radius, the cam surface 92 has an inclined flat stretch 94 that is at generally the same angle as inclined cam surface 88 of studs 64

Each cam locking shaft 68 is designed to reside in either an unlocked position as illustrated by the lower shaft 68 in FIGS. 9 and 12, and a locked position as illustrated by the upper shaft 68. In the unlocked position, the transverse notch 90 of cam locking shaft 68 is aligned with hole 66 so that the inner arcuate surface 96 of notch 90 is essentially flush with adjacent surface portions of hole 66. This enables locking stud 64 to move axially within hole 66 such that studs 64 can be freely inserted into and removed from holes 66 during attachment and detachment of a mold block 40, 42 from back plate 36, 38. On the other hand as a cam locking shaft 68 is rotated into its locked position, its cam surface 92 bears progressively tighter and tighter against cam surface 88 of stud 64, causing stud 64 to be drawn tightly into hole 66 and retained in such condition by cam surface 92. When locking shaft 68 is in its locked position, the mass of the shaft below notch 90 projects up into hole 66 so as to block extraction of stud 64 from hole 66.

As illustrated in FIGS. 11, 13 and 14, each cam locking shaft 68 has a spring-loaded ball detent 98 adjacent the normally inner end thereof that is biased in a radially outward direction so as to protrude yieldably slightly beyond the periphery of shaft 68 unless otherwise restrained. A small transverse bore 100 (FIG. 11) in the back plate 36 or 38 intersects bore 72 so as to provide a seat for ball detent 98 when cam locking shaft 68 is in its unlocked position. This helps to assure that transverse notch 90 is properly positioned to provide clearance within hole 66 for locking stud 64 during insertion and removal of the stud from hole 66. When cam locking shaft 68 is in its locked position, the ball detent 98 is pushed yieldably inwardly out of a retaining position by virtue of the interior surface of bore 72 as illustrated by the upper cam locking shaft 68 in FIG. 11. A transversely extending roll pin 102 (FIGS. 9 and 13) is received within an annular groove 104 in each cam locking shaft 68 generally adjacent the outer end thereof to prevent unintended axial displacement of locking shaft 68 during rotation and at other times.

As illustrated in FIG. 10, each back plate 36, 38 has locating pins 106 that project outwardly from the front face thereof and are adapted to be received within receiving holes 108 in the backside 62 of mold blocks 40 or 42 when the latter are secured to back plates 36, 38. As illustrated in FIG. 5 with respect to back plate 36, a pair of such locating pins 106 are provided on each back plate generally adjacent the upper edge thereof between the two upper holes 66.

Figure 17:
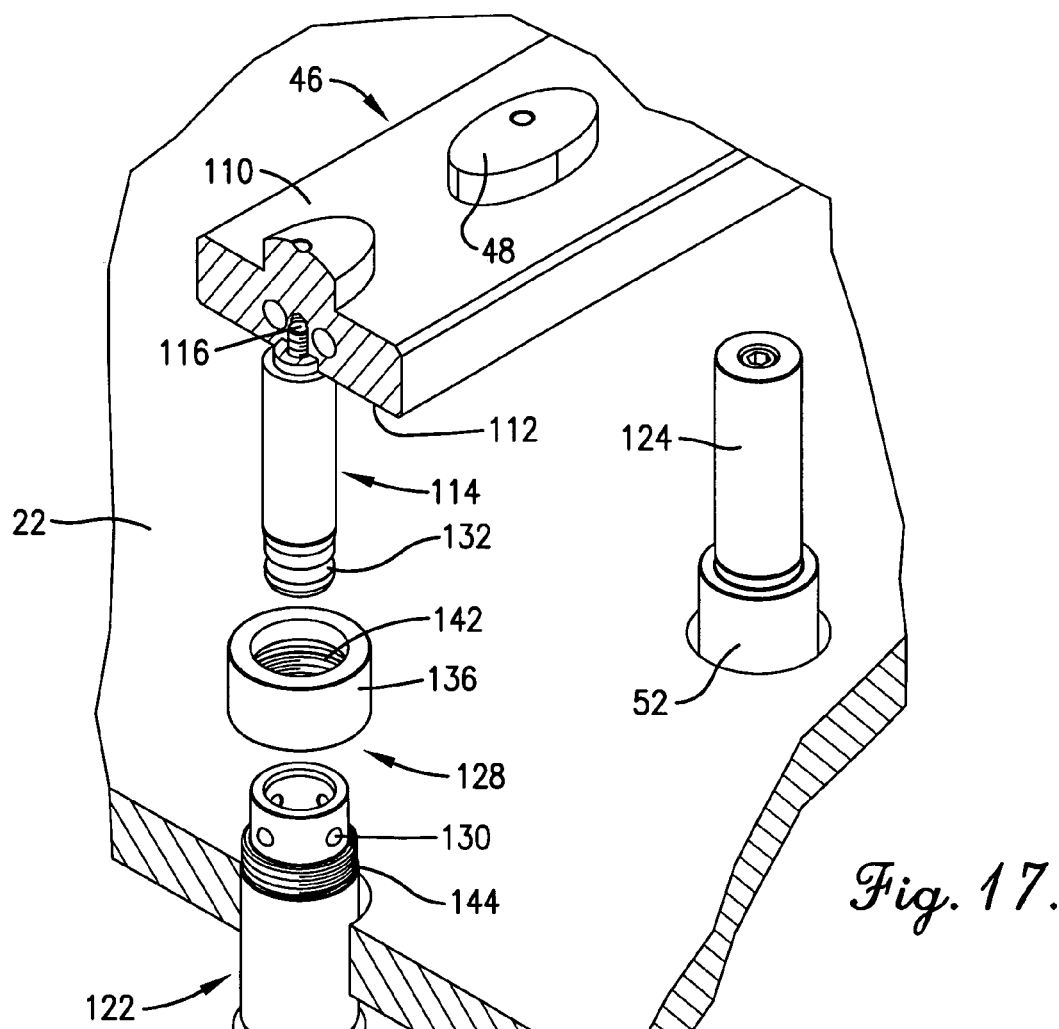
FIG. 17 is a fragmentary, partially exploded cross sectional isometric view of the pushup plate and its quick change coupling arrangement with the pushup mechanism of the machine.
Figure 18:
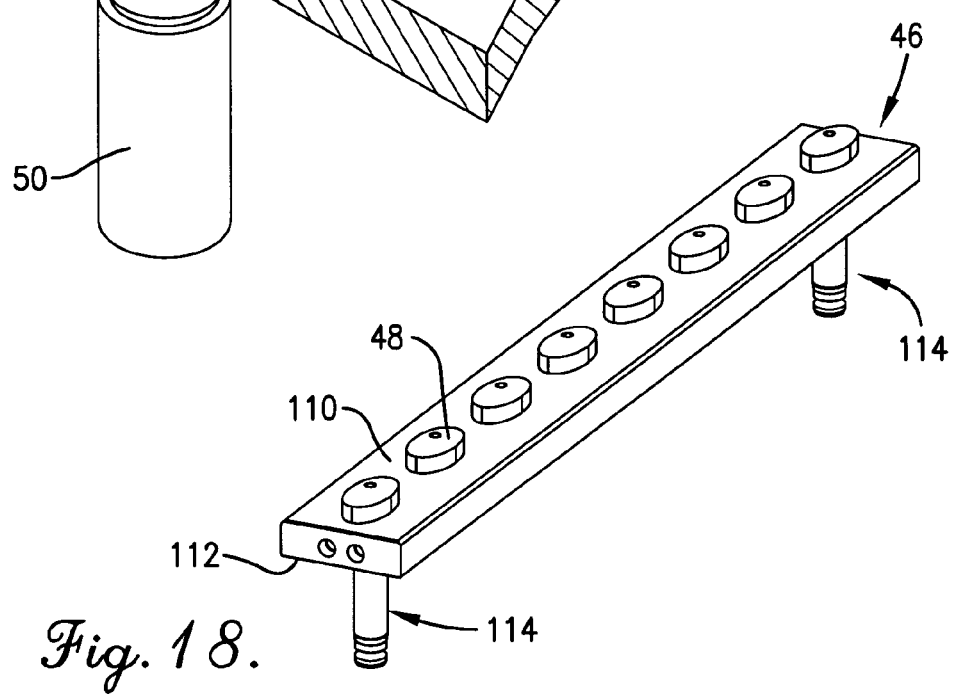
FIG. 18 is an isometric view of a quick change pushup plate in accordance with the present invention.
Figures 19, 20, 21:
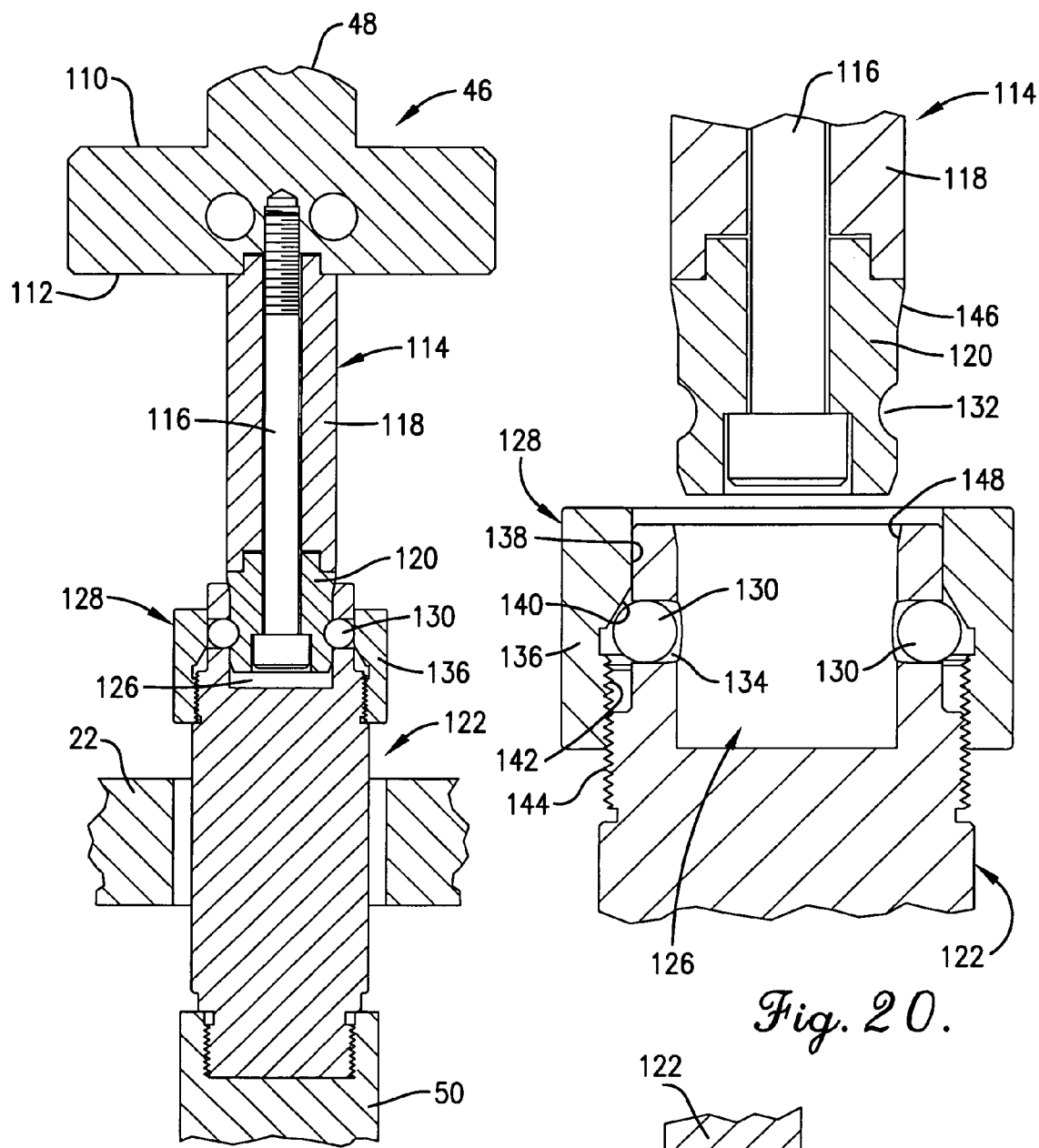
FIG. 19 is an enlarged, fragmentary vertical cross sectional view through the pushup plate and quick change coupling in accordance with the present invention.
FIG. 20 is an enlarged, fragmentary cross sectional view of the quick change coupling of the pushup plate showing the keeper collar of the coupling in its unlocked position.
FIG. 21 is an enlarged, fragmentary cross sectional view through the coupling of FIGS. 19 and 20 illustrating the manner in which a detent ball of the coupling is retained within its operating passage.

With reference particularly to FIGS. 17-21, the pushup plate 46 comprises an elongated, rectangular bar having a top side 110 and a bottom side 112. Top side 110 is machined to present the mold contours or surfaces 48, while the bottom side 112 has one or more locking studs 114 projecting downwardly therefrom. In the illustrated embodiment a pair of locking studs 114 are provided adjacent opposite ends of pushup plate 46 as illustrated in FIG. 18. The two locking studs 114 are each secured to the bottom side of pushup plate 46 by suitable fastening means such as a long bolt 116 (FIGS. 17, 19). In the illustrated embodiment, the studs 114 include an elongated spacer portion 118 in addition to the lower working portion 120 as hereinafter explained in more detail. Depending upon the size and shape of the bottle being blown, such a spacer portion 118 may or may not be necessary.

Each of the locking studs 114 is releasably coupled with a socket member 122 that is in turn threadably attached to a pushup ram 50 or 56 of the pushup mechanism. The two central pushup rams 52 and 54 of the pushup mechanism are not positively connected to the pushup plate 46. Instead, at those locations, the pushup plate 46 merely rests on top of cylindrical spacers 124 that are threadably secured to pushup rams 52 and 54.

The lower end of each locking stud 114, in the area of working portion 120, is adapted to be releasably received within a socket 126 of the corresponding socket member 122. Each socket member 122 is provided with a coupling assembly 128 that serves as a means for securely retaining stud 114 within socket 126 but also permitting quick release of stud 114 without requiring the use of tools. In this respect, coupling assembly 128 includes at least one ball detent 130 (preferably four) that is adapted to lock into a receiving notch on the lower end of locking stud 114 in the nature of an annular groove 132. As illustrated particularly in FIG. 12, each ball detent 130 operates within its own transverse passage 134 in the wall of socket member 122 and is movable within such passage 134 in a radial direction toward and away from socket 126. Each passage 134 has reduced diameter opposite ends 134a and 134b as illustrated in FIG. 21 to prevent ball detent 130 from escaping.

Each ball detent 130 is movable within its passage 134 between a locking position as in FIG. 19 wherein the ball detent 130 is received within groove 132, and an unlocking position as in FIG. 20 wherein the ball 130 is out of groove 132. A keeper in the nature of a collar 136 circumscribes the upper end of socket member 122 and is movable axially thereof between locked and unlocked positions for selectively keeping detent balls 130 in their locking positions. An internal, annular blocking surface 138 on collar 136 precludes movement of detent balls 130 out of their locking positions when keeper collar 136 is in its locked position of FIG. 19, while when keeper collar 136 is in its unlocked position of FIG. 20, blocking surface 138 clears ball detents 130 and allows them to be moved radially outwardly to their unlocking positions in which they are partially received within an annular recess 140 in the interior surface of keeper collar 136. Preferably, keeper collar 136 has a set of internal threads 142 below recess 140 that are threadably engaged with external threads 144 on socket member 122 below ball detents 130 such that axial shifting of keeper collar 136 between locked and unlocked positions is carried out by simply rotatably threading keeper collar 136 in the appropriate direction along socket member 122. Preferably, the exterior of keeper collar 136 is knurled to facilitate manual gripping thereof. In an alternative embodiment, the exterior of keeper collar 136 may be provided with wrench flats to facilitate manipulation of keeper collar 136 using a suitable wrench or other tool, but the preferred embodiment is to have keeper collar 36 operable by hand.

Operation

In accordance with the present invention, the tooling that contains the blow mold surfaces, i.e., the mold blocks 40, 42 and pushup plate 46, is adapted to be quickly and easily changed out. Mold blocks 40, 42 are quickly and easily locked and unlocked from their back plates 36, 38 by appropriately rotating cam locking shafts 68 which are easily accessible from opposite side edges 70 of back plates 36, 38. Pushup plate 46 is similarly easily locked and unlocked from pushup rams 50 and 56 by threading keeper collars 136 in the appropriate direction. Back plates 36 and 38 are unaffected by change out of mold blocks 40, 42 such that readjustment of the vertical position of back plates 36, 38 after each change out is not necessary.

Assuming that a change out of the mold tooling is desired, the machine platens 24, 26 are first fully retracted as in FIG. 4 so that mold blocks 40, 42 are in their open position. Pushup rams 50-56 are also retracted, or not, depending upon the type of machine involved. With the machine in this condition, the cam locking shafts 68 of each mold plate 36, 38 may be rotated into their unlocked position using an Allen wrench or other suitable tool. This places cam locking shafts 68 in the condition illustrated by the lower locking shaft 68 in FIGS. 9 and 12 such that notch 90 comes into transverse alignment with hole 66 and notch surface 96 becomes substantially flush with the adjacent surfaces of hole 66. Consequently, locking studs 64 are free to be moved axially of holes 66, permitting first one of the mold blocks 40, 42 and then the other to be pulled off their corresponding back plate 36, 36 as illustrated for example in FIG. 5. The removed mold blocks 40, 42 are then placed to one side.

To remove pushup plate 46, keeper collars 136 are first rotated in the appropriate direction to move them axially upwardly from the locked position of FIG. 19 to the unlocked position of FIG. 20. Lifting upwardly on pushup plate 46 then causes the groove 132 of each locking stud 114 to push the detent balls 130 outwardly to their unlocked positions as studs 114 are withdrawn from sockets 126. The removed pushup plate 46 may then be placed to one side.

To install new tooling, the operator first confirms that all of the cam locking shafts 68 are in their unlocked positions. The ball detents 98 of FIG. 11 are particularly helpful at this time with respect to yieldably holding the cam locking shafts 68 in their full unlocked positions. Then, each new mold block 40, 42 is lifted into place and the studs 64 are inserted into holes 66. Locating pins 106 on the back plates enter into holes 108 in the backside 62 of mold blocks 40, 42. Cam locking shafts 68 are then rotated toward their locking positions in the appropriate amount using an Allen wrench or the like, which causes the cam surface 92 of each cam locking shaft 68 to bear progressively more firmly against cooperating cam surface 88 of the stud 64, thereby drawing the mold block 40, 42 tightly against the front face of the corresponding back plate 36 or 38. Once cam locking shafts 68 have been snugly locked against the cam surfaces 88 of studs 64, the mold blocks will be securely held against accidental release from the back plates 36 or 38. If desired, an additional locking means such as a set screw or the like could be employed to maintain each cam locking shaft in its locked condition.

To install a new pushup plate 46, the operator first assures that the keeper collars 136 of socket members 122 are in their unlocked positions. Assuming that to be the case, locking studs 114 of the new pushup plate are inserted into sockets 126 of the two socket members 122 to the extent permitted by an external tapered surface 146 on each stud 114 engaging an internal, beveled surface 148 at the mouth of socket 126. With surfaces 146 and 148 so engaged, ball detents 130 will be aligned with groove 132. As keeper collar 136 is screwed down, the angled surface of annular recess 140 progressively cams detent balls 130 inwardly and into groove 132. Once keeper collar 136 is fully screwed down, blocking surface 138 is in alignment with detent balls 130 to preclude their release from groove 132.

It will thus be seen that change out of the mold surface tooling can be quickly and easily carried out. Yet, the components containing the mold surfaces are well secured in place to carry out their molding functions during repeated blow cycles.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Quick change tooling for the blow station of a bottle forming machine comprising:
    a pair of opposed back plates attachable to a corresponding pair of platens of the machine and movable relatively toward and away from one another with the platens between open and closed positions;
    a pair of opposed mold blocks secured to the back plates for movement therewith and each having a plurality of mold cavity halves disposed thereon for cooperating with corresponding cavity halves in the opposite mold block to form a series of blow cavities when the back plates are in their closed position,
    said mold blocks being releasably attachable to their back plates to permit the mold blocks to be exchanged for a different pair of mold blocks; and
    a push-up plate having a plurality of bottom contours disposed thereon for cooperating with the cavity halves in forming the bottoms of the blow cavities when the back plates are in their closed position,
    said push-up plate being releasably attachable to the machine to permit the push-up plate to be exchanged for a different push-up plate.

2. Quick change tooling as claimed in claim 1,
    said push-up plate having at least one stud secured thereto and projecting therefrom,
    further comprising a socket member having a socket for removably receiving said stud, and a releasable coupling for selectively retaining the stud within the socket member.

3. Quick change tooling as claimed in claim 2,
    said releasable coupling including a notch in said stud, a detent in said socket member movable transversely of the stud into and out of said notch, and a keeper selectively movable on said socket member between a locked position blocking movement of the detent out of said notch and an unlocked position allowing movement of the detent out of the notch.

4. Quick change tooling as claimed in claim 3,
    said keeper comprising an annular collar circumscribing the socket member and movable axially along the latter between said locked and unlocked positions,
    said collar having an inner periphery provided with a blocking surface disposed for alignment with said detent when the collar is in its locked position and for clearing the detent when the collar is in its unlocked position.

5. Quick change tooling as claimed in claim 4,
said detent comprising a ball.

6. Quick change tooling as claimed in claim 5,
said notch comprising an annular groove circumscribing said stud.

7. Quick change tooling as claimed in claim 1,
each of said back plates having a front face and a pair of opposite side edges,
said mold blocks being attachable to the front faces of the back plates,
each mold block having at least one locking stud fixed thereto and projecting into a receiving hole in its back plate,
each back plate having a locking shaft accessible from a side edge of the back plate and rotatable between a locked position in which the shaft is disposed to retain the stud against withdrawal from the hole and an unlocked position in which the shaft is disposed to release the stud from the hole.

8. Quick change tooling as claimed in claim 7,
each of said locking studs having a first cam surface,
each locking shaft having a second cam surface disposed to progressively tighten against said first cam surface as the locking shaft is rotated toward said locked position.

9. Quick change tooling as claimed in claim 8,
said locking shaft having a transverse notch disposed to clear the stud for insertion and removal from the hole when the locking shaft is in its unlocked position,
said second cam surface comprising a peripheral surface on the locking shaft extending in a circumferential direction around the locking shaft from one end of the notch to the other end of the notch.

10. Quick change tooling as claimed in claim 9, said locking stud having a transverse notch presenting an arcuate clearance surface provided with a radius of curvature and an inclined surface leading from said arcuate surface,
said inclined surface comprising said first cam surface.

11. Quick change tooling as claimed in claim 1,
said back plates being movable horizontally between said open and closed positions.

12. Quick change tooling as claimed in claim 11,
said push-up plate being movable vertically between extended and retracted positions.

13. Quick change tooling as claimed in claim 1,
said plurality of mold cavity halves of each mold block being machined into said mold block.

14. Quick change tooling as claimed in claim 13,
said plurality of bottom contours being machined onto said push-up plate.

15. Quick change tooling as claimed in claim 1,
said plurality of bottom contours being machined onto said push-up plate.

16. Quick change blow mold tooling comprising a push-up plate having a plurality of bottle bottom contours on one side thereof and at least one locking stud projecting from the opposite side thereof.

17. Quick change blow mold tooling as claimed in claim 16,
each of said locking studs having a transversely extending locking notch therein.

18. Quick change blow mold tooling as claimed in claim 17,
each of said locking studs being generally cylindrical.

19. Quick change blow mold tooling as claimed in claim 18,
said locking notch comprising an annular groove.

20. Quick change blow mold tooling comprising:
a push-up plate having a plurality of bottom contours on one side thereof and at least one locking stud projecting from the opposite side thereof;
a socket member having a socket adapted to releasably receive said stud of the push-up plate; and
a releasable coupling adapted for releasably retaining the stud within the socket of the socket member.

21. Quick change blow mold tooling as claimed in claim 20,
said releasable coupling including a notch in said stud, a detent in said socket member movable transversely of the stud into and out of said notch, and a keeper selectively movable on said socket member between a locked position blocking movement of the detent out of said notch and an unlocked position allowing movement of the detent out of the notch.

22. Quick change blow mold tooling as claimed in claim 21,
said keeper comprising an annular collar circumscribing the socket member and movable axially along the latter between said locked and unlocked positions,
said collar having an inner periphery provided with a blocking surface disposed for alignment with said detent when the collar is in its locked position and for clearing the detent when the collar is in its unlocked position.

23. Quick change blow mold tooling as claimed in claim 22,
said collar being threaded onto said socket for threaded movement between said locked and unlocked positions.

24. Quick change blow mold tooling as claimed in claim 21,
said detent comprising a ball.

25. Quick change blow mold tooling as claimed in claim 21,
said notch comprising an annular groove circumscribing said stud.

* * * * *